UNITED STATES PATENT OFFICE.

JAMES TAYLOR CARRICK, OF JOHANNESBURG, TRANSVAAL.

TREATMENT OF PYRITIC COPPER AND COPPER-NICKEL ORES.

947,789. Specification of Letters Patent. Patented Feb. 1, 1910.

No Drawing. Application filed June 8, 1909. Serial No. 500,899.

*To all whom it may concern:*

Be it known that I, JAMES TAYLOR CARRICK, geologist, subject of the King of Great Britain, residing at the New Club, Johannesburg, Transvaal, have invented new and useful Improvements in the Treatment of Pyritic Copper and Copper-Nickel Ores, of which the following is a specification.

The present invention is a wet process for the direct treatment of ores containing copper sulfid and iron with or without nickel; the process being applicable to the treatment of ores which on account of their low grade or special local conditions will not pay for smelting. The process is superior to other direct processes for the treatment of such low grade ores since in the majority of cases it enables practically the whole of any nickel or cobalt present to be recovered.

Ores containing the higher sulfids of the metals are subjected, prior to this process, to a preliminary partial desulfurization in the absence of air in order to render them soluble in acid, the hot desulfurized ore being dropped into water in order to comminute it. The crushed ore, thus prepared if necessary, or in its raw state where possible, is digested with the assistance of heat with an excess of hydrochloric acid, in the absence of oxygen, until the iron and also the nickel if present, are dissolved out. The hydrogen sulfid evolved by such digestion is converted into sulfuric acid, which is used for regenerating the hydrochloric acid, as stated hereunder. The digester liquor is leached or otherwise withdrawn from the undissolved cuprous residue without allowing air to come in contact with said residue; and where nickel is present, it is separated from the iron by suitable steps such as the following. The solution is rendered strongly alkaline with ammonia, and air is aspirated through it for a prolonged period. Any nickel carried down with the iron precipitate so formed is dissolved out of it with dilute hydrochloric acid, which acid is then added to that for a subsequent digestion. The bulk of the nickel remains in solution, and after removal of the iron precipitate, such nickel is thrown down by the addition of lime. The calcium chlorid solution remaining after removal of the iron and nickel is treated in slight excess, with, for instance, the sulfuric acid manufactured from the hydrogen sulfid evolved during digestion as hereinbefore described. By this means calcium sulfate is precipitated and hydrochloric acid set free; the latter being then distilled off from the calcium sulfate, condensed and employed for the digestion of further ore. The ore remaining in the treatment vat after removal of the iron and nickel, consists of a porous mass of gangue and cuprous sulfid containing some free acid. It is now caused to oxidize; preferably by adding water and sulfuric acid and strongly agitating the pulp so formed, by injection of compressed air. Owing to its cellular condition the bulk of the sufid rapidly oxidizes to cupric sulfate, which may, after say 24 hours, be leached out. The sulfate of copper may be crystallized out of solution and either marketed as such or treated as desired for the recovery of metallic copper. The residue is then thrown out onto a dump which is laid on impervious ground and maintained in an acid condition by sprinkling it with dilute sulfuric acid from time to time as may be necessary. For this purpose the excess acid made from the hydrogen sulfid as herein described may be used. By this means the remaining copper sulfids are converted entirely into soluble sulfate, without the formation of insoluble compounds. The cupric sulfate so formed is gradually leached out by the acid water assisted by any rain which may fall, the liquid which percolates from the bottom of the dump being collected in trenches and treated for the recovery of its copper.

What I claim and desire to secure by Letters Patent is:

1. The process of treating pyritic copper ores, which consists in removing the iron so as to leave the copper sulfid in a porous condition, subsequently oxidizing said sulfid in the presence of acid and leaching out the sulfate so formed.

2. The process of treating pyritic copper ores, which consists in digesting the crushed ore with hydrochloric acid in the absence of air, until the iron is substantially dissolved and the cuprous sulfid is left in a porous condition, removing the dissolved iron, subsequently oxiding the cuprous residue in the presence of acid and leaching out the copper sulfate so formed.

3. The process of treating pyritic copper nickel ores, which consists in digesting the crushed ore with hydrochloric acid in the absence of air, until the iron and nickel are substantially dissolved and the copper sulfid is left in a porous condition, withdrawing the liquor, removing the iron and nickel separately therefrom, subsequently oxidizing the cuprous residue in the presence of acid and leaching out the copper sulfate so formed.

4. The process of treating pyritic copper nickel ores, which consists in digesting the crushed ore with hydrochloric acid in the absence of air, until the iron and nickel are substantially dissolved out and the copper sulfid is left in a porous condition, withdrawing the liquor, precipitating the iron therefrom by the addition of excess ammonia and oxidation, removing said precipitate, precipitating the nickel by means of lime, oxidizing the cuprous digester residue in the presence of acid and leaching out the copper sulfate so formed.

5. The process of treating pyritic copper nickel ores, which consists in removing the iron so as to leave the copper sulfid in a porous condition, subsequently oxidizing said sulfid, in the presence of acid, by addition of water thereto and agitating the pulp so formed with air, leaching out cupric sulfate so formed, conveying the residue to a dump, maintaining said dump in an acid condition and leaching the same.

In testimony whereof I have signed my name to this specification in the presence of two subscribing witnesses.

JAMES TAYLOR CARRICK.

Witnesses:
ALFRED L. SPOOR,
W. HILLMAN VINCENT.